3,544,477
INORGANIC LIQUID LASER MEDIA AND METHOD OF PREPARATION THEREOF
Adam Heller, Bayside, N.Y., assignor to General Telephone & Electronics Laboratories, Incorporated, a corporation of Delaware
Filed Aug. 17, 1967, Ser. No. 661,298
Int. Cl. C09k 1/04; H01s 3/20
U.S. Cl. 252—301.1                                    4 Claims

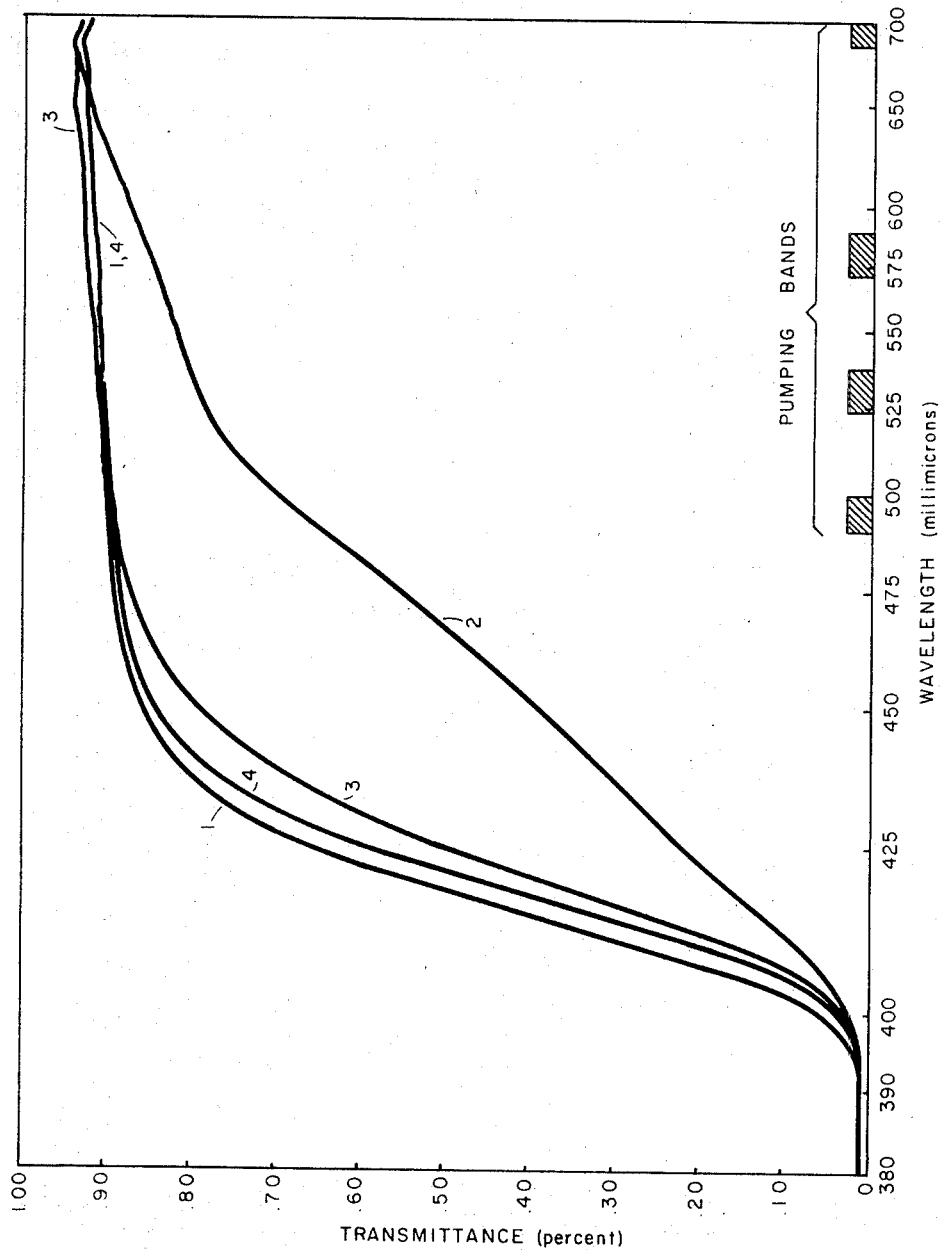
INVENTOR.
ADAM HELLER

# United States Patent Office 3,544,477
Patented Dec. 1, 1970

ABSTRACT OF THE DISCLOSURE

A method for eliminating colored impurities in an inorganic liquid laser solution containing an active ion selected from the group consisting of ions of chromium, manganese, molybdenum, holmium, dysprosium, praseodymium, neodymium, europium, samarium, terbium, erbium, ytterbium, thulium and uranium, an inorganic solvent selected from the group consisting of $SeOCl_2$, $SeOBr_2$ and $SbCl_3$, a Lewis acid, and an oxidizing agent formed of a compound having the formula $AClO_x$ wherein A is a colorless metal cation, Cl and O are chlorine and oxygen respectively, and $x$ is within the range of 1 to 4 is described. The oxidizing agent decomposes in the solution and oxidizes colored impurities therein which otherwise interfere with the pumping of the medium or absorb at the laser output frequency.

BACKGROUND OF THE INVENTION

This invention relates to inorganic liquid lasers and the preparation thereof.

The operation of the laser depends on the interaction of radiation with matter which occurs when matter (i.e. atoms or molecules) either absorbs or emits photons. Usually, atoms and molecules exist in a stable non-radiating or ground state in which energy is not emitted. This state corresponds to a fixed quantity or level of internal energy. When an atom is in the ground state and interacts with an incident photon, the atom or molecule can absorb the energy of the photon and be placed in a higher or "excited" state, provided that the energy of the photon is at least equal to the difference in energy of the ground and excited states. Similarly, when the energy level of an atom or molecule is suddenly changed from one state to a lower energy state, a photon of radiation may be produced. The energy of this photon will be equal to the difference in energy between these states.

An atom in an excited state can emit a photon spontaneously and revert to its ground state or some intermediate state. However, during the period in which the atom is still excited, it can be stimulated to emit a photon by interacting with an incident photon if the energy of this incident photon is substantially equal to that of a photon which would otherwise be emitted spontaneously. As a result, the incoming photon or wave is augmented by the one given up by the excited atom. This released wave falls in phase with the wave that triggered its release. Hence, an amplifying action ensues. This phenomenon is known as stimulated emission.

Under ordinary conditions, there are more atoms in the lower energy states than in the higher energy states. In the laser, the distribution of electrons among the energy levels is changed by a process of "pumping" so that there will be more atoms in the higher than in the lower states. The incident photons of the lowest energy can produce more downward than upward transitions and stimulated emission can be produced. This process of "pumping" consists of injecting energy into the assemblage of atoms whereupon the atoms absorb energy and are raised into excited states. The injected energy per unit time must exceed a threshold value determined primarily by the characteristics of the active medium in order to result in stimulated radiation.

The power threshold of a laser may be throught of in terms of the power density necessary to produce stimulated emission of radiation and is typically specified for given laser structure by the energy in joules of a pulse of recited duration. Neglecting the losses inherent in the particular laser structure, the excitation power threshold, output power, conversion efficiency, and energy output are functions of the absorption spectrum, the concentration of active ions, and the quantum yield of fluorescence of the active medium. One type of liquid active medium having a relatively high concentration of active ions and a relatively high quantum yield of fluorescence is described in my copending application Ser. No. 604,362, filed Dec. 23, 1966. As discussed therein, this inorganic liquid medium is characterized by a low power threshold, for example a pulse of 4 joules applied in a 100 microsecond interval, for the initiation of stimulated emission.

The liquid active medium which is the subject of the copending application is a solution of a compound containing an active agent, an inorganic solvent capable of dissolving the compound and a Lewis acid for enhancing the solubility of the compound. The active agent is characterized by having at least one excited state or luminescent level to which it may be raised by the absorption of energy. In addition, the molar absorbance of the active agent must be sufficient to assure that a substantial part of the incident radiant energy is absorbed throughout the volume of the solution. The compound containing the active agent is generally a polar compound which dissociates in solution to form cations and anions. In solution, an active ion is solvated forming a molecular or ionic complex wherein the ion is surrounded by a zone of oriented donor molecules.

When complexed, the active ion is bound by coordinate bonds to the surrounding solvent molecules. A coordinate bond is formed by the sharing of a pair of electrons between the active ion and an atom of the solvent molecule. The particular atom of the solvent molecule forming a coordinate bond with the active ion is known as the immediate neighbor atom. Atoms bound to an immediate neighbor atom are referred to as second neighbor atoms. The solvent employed, normally $SeOCl_2$, is characterized by the fact that the energy of the stretching vibration between the immediate and the second neighbor atoms of the oriened solvent molecule in the coordination complex must be at least as small as one-half of the energy difference between the luminescent level and the highest level of the ground state multiplet of the active agent. In addition, the solvent must possess a relatively high dielectric constant so that the forces between the cation and anion of the compound are reduced thereby preventing precipitation and a lowering of the concentration of the active ion in solution.

The addition of the Lewis acid to the solvent gives rise to a cation which is characteristic of the solvent and promotes the dissociation of the solvent molecule. As a result, the number of solvent cations in the solution increases. The solvent cations combine with the compound anions which in a similar manner permits the concentration of the compound cations to increase without saturating the solution. The polar compound cations are normally the active ions and increasing the concentration thereof decreases the threshold of the laser medium.

Active liquid media containing the compound of the active agent, the solvent and a Lewis acid have been found to exhibit the low energy threshold and high gains heretofore obtainable only with single crystal laser media. Furthermore, the gain of a laser employing this inorganic liquid medium, i.e. the ability of the laser to amplify light at the frequency of the stimulated emission as it passes through the medium, is sufficiently high to permit operation without the use of reflecting surfaces.

An additional advantage obtained by the use of this type of medium is due to the relative ease with which the medium may be prepared. Briefly, one method of preparation comprises diluting the Lewis acid by the gradual addition of the solvent. Then, the compound containing the active agent is added to the mixture and the solution is brought to a boil. Alternatively, the compound may be mixed with the acid and the solvent added thereto. Next, a small amount of the Lewis acid is distilled off to remove any traces of water. The solution is then cooled to room temperature. The preparation of the medium takes place in a water-free environment.

While the inorganic liquid media prepared by this relatively simple technique has been found to possess the afore-discussed low power thresholds and relatively high laser outputs, an undesirable discoloration of the medium has been observed. This discoloration has been found to occur when the solutions are boiled to remove traces of hydrogen containing compounds. This boiling results in the formation of decomposition products of the solvent. Some of these decomposition products are colored and are found to interfere with the optical pumping of the medium and/or absorb energy at the laser frequency. As a result, the presence of these products results in an increase in the power threshold and a decrease in the laser output as compared with the threshold and output of liquid active medium comprising the same active ion and solvent and having a color which is characteristic of the absorption of the active ion.

SUMMARY OF THE INVENTION

According to the present invention, an inorganic active medium for a liquid laser is provided which is formed from an active agent, an inorganic solvent, a Lewis acid, and an oxidizing agent. The oxidizing agent has a general formula $AClO_x$ wherein A is a colorless metal cation, Cl is chlorine, O is oxygen and $x$ is an integer within the range of 1 to 4. In practice, preferred oxidizing agents employed an alkaline earth metal as the cation A. When added to this solution, the agent decomposes and oxidizes colored impurities contained therein. The addition of this oxidizing agent to the medium has been found to reduce the power threshold and increase the laser output.

The active medium described in my copending application Ser. No. 604,362, filed Dec. 23, 1966, is comprised of an inorganic solvent characterized by a high dielectric constant and an energy of stretching vibration between the immediate and second neighbor atoms of the oriented solvent molecule which is at least as small as one-half of the difference in energy levels of the active agent. When in the solution, the active ion is complexed by the solvent molecules. In order to increase the concentration of active ions in the solution, the Lewis acid is added thereto. This three constituent laser medium contains relatively heavy atoms so that no vibration of sufficient energy are present therein to accept the energy difference relied on for stimulated emission. Generally, the constituents of this medium are selected so as not to contain hydrogen or other relatively light atoms.

In the preparation of the aforedescribed media, the solution was boiled at elevated temperatures to remove traces of hydrogen-containing compounds. As a result of this boiling, decomposition products were formed. Certain of these products were colored and interfered with the optical pumping of the medium by the absorption of the injected radiation. In addition, these colored decomposition products were found to be absorbent of energy at the output frequency of the laser. The presence of these products resulted in increased thresholds and decreased outputs for the medium. It has now been found that these colored impurities can be essentially eliminated from the solution by the addition of the oxidizing agent to the solution.

During the preparation of the medium, the oxidizing agent is added to the solution after it has been boiled to remove traces of hydrogen-containing compounds. The amount of agent added to the solution is determined by the amount of the impurities therein. In practice, the oxidizing agent is added in increasing quantities until the solution exhibits the color characteristic of the absorption of the active agent. The agent decomposes and bleaches the solution by the oxidization of the colored impurities therein. Any colored gases which are formed during the oxidization of the impurities are removed by either reducing the pressure on the solution, permitting the gases to escape or by passing nitrogen therethrough.

Further features and advantages of the invention will become more readily apparent from the following detailed description of a specific embodiment when taken in conjunction with the accompanying drawing.

BRIEF DESCRIPTION OF THE DRAWING

The figure contains a series of curves showing the improved transmittance of a laser medium made in accordance with the present invention.

DESCRIPTION OF THE PREFERRED EMBODIMENT

The present active liquid laser medium contains an active agent which is added to a solution comprised of an inorganic solvent and a Lewis acid. The agent is typically the cation of a polar compound. While this polar compound may be any suitable salt containing the ion, oxides and chlorides of the active agent are preferred due to the relative ease with which they may be prepared.

The active agent is characterized by having at least one excited state or luminescent level to which it may be raised by the absorption of energy. In addition, the active agent is required to have a molar absorbance within the range of 0.01 to 1000 cm.$^{-1}$ lit mol$^{-1}$ for the effective absorption of the pumping energy. Preferred active agents are selected to be at least one of the following metals: chromium, manganese, molybdenum, praseodymium, neodymium, dysprosium, holmium, sumarium, terbium, erbium-thulium, europium, ytterbium and uranium.

Since polar compounds are generally characterized by low solubility products in solvents having low dielectric constants, the inorganic solvent is required to have a dielectric constant of at least 20. When the compound dissociates into cations and anions, the active agent is the cation which forms a complex with the solvent. In other words, the cation is solvated by a surrounding zone of oriented solvent ions. The cation forms a coordinate bond with an immediate neighbor atom of the solvent ion. Atoms in the solvent ion bound to the immediate neighbor atom are referred to herein as second neighbor atoms.

In order to prevent radiationless relaxations of the excited active ion, the solvent must contain only relatively heavy atoms. This is due to the fact that the energy of stretching vibration between two atoms is a function of the inverse of the product of their masses. And the energy of stretching vibration between the immediate and second neighbor atoms of the solvated active ion must be at least as small as one-half the difference in energy between the luminescent level of the ion and the highest level of its ground state multiplet to provide the stimulated emission of radiation. Further discussion on these requirements is contained in my aforereferenced copending application.

The inorganic solvents $SeOCl_2$, $SeOBr_2$, and $SbCl_3$ are examples of solvents possessing the necessary characteristics. Particularly successful laser operation has occurred with media utilizing $SeOCl_2$ as the solvent. As mentioned, a Lewis acid is added to the solvent to increase the amount of the polar compound going into solution. A Lewis acid, as defined in the art and as used herein, is a substance which can accept an electron pair from a base. The Lewis acid combines with the anion of the solvent and thereby promotes dissociation of the solvent.

In the preparation of the medium, the Lewis acid is diluted by the gradual addition of the solvent. Then, the compound containing the active agent is added to the mixture. Next, the solution is brought to a boil and about 10% of the Lewis acid is distilled off. The boiling step removes any traces of water or other hydrogen-containing compounds. The following examples illustrate the reactions occurring during preparation.

EXAMPLE 1000 grams of the Lewis acid, $SnCl_4$, was diluted to two liters by the gradual addition of vacuum distilled $SeOCl_2$. The exothermic reaction, excluding solvent participation, is $$2SeOCl_2 + SnCl_4 \rightleftharpoons 2SeOCl^+ + SnCl_6^{2-}$$

Then 150 grams of neodymium chloride, $NdCl_3$, was added to the mixture. The reaction introducing the active ions into the solution is $$NdCl_3 + 3SeOCl^+ \rightleftharpoons Nd^{3+} + 3SeOCl_2$$

The solution was brought to a boil at a temperature of about 109–114° C., and about 10% of the $SnCl_4$ was distilled off. Then the solution was cooled to room temperature. The active ion concentration was about 0.3 N. The prepared solution was discolored by the presence of brown impurities. Although the solution provided stimulated emission of radiation, the impurities were found to interfere with the optical pumping and to absorb energy at the output frequency of the stimulated emission.

It has been found that the colored impurities are a result of the decomposition of the solvent molecule during boiling. The chemical reactions taking place are as follows:

$$2SeOCl_2 \rightleftharpoons SeO_2 + SeCl_4$$
$$2SeCl_4 \rightarrow Se_2Cl_2 + 3Cl_2$$
$$Se_2Cl_2 \rightarrow 2Se + Cl_2$$

The resulting $Se_2Cl_2$ and Se are the colored impurities and are formed during the irreversible reactions wherein chlorine is liberated.

These colored impurities are essentially eliminated from the solution by the addition of an oxidizing agent having the general formula $AClO_x$ wherein A is a colorless metal cation, Cl is chlorine, O is oxygen and $x$ is an integer within the range of 1 to 4. Since the additive is an oxidizing agent, it bleaches the solution by the oxidation of the impurities to non-interfering colorless products such as selenium oxychloride or selenium dioxide. For example, the addition of anhydrous potassium chlorate, $KClO_3$, to the solution after the formation of the colored impurities bleaches the solution according to the following reactions.

$$2Se_2Cl_2 + 2KClO_3 + SnCl_4 \rightarrow 2SeO_2 + 2SeOCl_2 + K_2SnCl_6$$

$$3Se + 2KClO_3 + SnCl_4 \rightarrow 3SeO_2 + K_2SnCl_6$$

In practice, the oxidizing agent is added slowly to a stirred solution at 60 to 110° C. until the solution becomes essentially the color which is characteristic of the active ion. For solutions containing neodymium, this characteristic color is blue. In the above example, 10 to 50 mg. per 100 g. of solution was usually sufficient to bleach the solution.

Any colored gases evolved during the oxidation of the impurities, such as $Cl_2$, $ClO_2$ and the like, are removed either by bubbling nitrogen through the solution, or by reducing the pressure over the solution.

The additive has the general formula $ABC_x$ wherein A is a colorless metal cation, B is chlorine, C is oxygen, and $x$ is an integer within the range of 1 to 4. The four anions, in the order of increasing $x$ are termed hypochlorite, chlorate, and perchlorate. Preferred colorless metal cations are selected from the group consisting of the alkali metals. In practice, sodium chlorate and potassium chlorate are found to be especially effective.

While the aforediscussed example referred to a medium containing the Lewis acid $SnCl_4$ and the oxide of an active agent, similar results are obtained for solutions containing other polar compounds and Lewis acids.

The results obtained by the use of the present oxidizing agent additive in the solution of the example are shown by the curves of FIG. 1. The curves show the spectral transmittance of the solution at four stages in the preparation at the present active laser medium. The pumping bands for a liquid laser employing this solution are indicated on the abscissa of FIG. 1.

Curve 1 shows the transmittance of the solution prior to the step of boiling to remove traces of hydrogen-containing compounds. Curve 2 illustrates the decrease in transmittance, i.e. the increased absorption of injected pump energy, due to the presence of the colored impurities. After the addition of the oxidizing agent, the spectral transmittance was again taken and is shown as curve 3. The solution was stirred at a reduced pressure of about 1 mm. for 30 minutes and the spectral transmittance characteristic 4 was obtained. The improvement in transmittance due to the addition of the oxidizing agent is clearly shown by the difference in curves 2 and 3. A further improvement is shown by curve 4 when colored gases, such as $Cl_2$, are removed.

What is claimed is:
1. The method of essentially eliminating colored impurities in an inorganic liquid of the type consisting essentially of a solution of a compound containing an active ion selected from the group consisting of ions of chromium, manganese, molybdenum, holmium, dysprosium, praseodymium, neodymium, europium, samarium, terbium, erbium, ytterbium, thulium, and uranium, an organic solvent selected from the group consisting of $SeOCl_2$, $SeOBr_2$, and $SbCl_3$ and a Lewis acid, the step which comprises adding an oxidizing agent to the solution, said oxidizing agent having the general formula $AClO_x$ wherein A is a colorless metal cation, Cl is chlorine, O is oxygen, and $x$ is an integer within the range of 1 to 4, said agent decomposing and oxidizing impurities in the solution whereby the solution attains the color characteristics of the absorption of the active agent.

2. The method of claim 1 in which A is an alkali metal.
3. The method of claim 1 in which said oxidizing agent is a chlorate of a colorless metal cation.
4. The method of claim 1 further comprising the step of removing gases from the solution after the addition of said oxidizing agent.

References Cited

UNITED STATES PATENTS 3,404,351   10/1968   Heller _____ 252—301.4
3,417,344   12/1968   Grantham _____ 252—301.4

TOBIAS E. LEVOW, Primary Examiner

D. R. EDMONDS, Assistant Examiner

U. S. Cl. X.R.

252—301.4